(12) United States Patent
Limmer et al.

(10) Patent No.: US 10,227,141 B2
(45) Date of Patent: Mar. 12, 2019

(54) SAFETY FUNCTION MODULE FOR A VEHICLE, IN PARTICULAR FOR A FLYING OBJECT

(71) Applicant: MBDA Deutschland GmbH, Schrobenhausen (DE)

(72) Inventors: Michael Limmer, Rehling (DE); Volker Stucky, Pöttmes (DE); Carsten Corduan, Wessiszell (DE); Dieter Fasol, Taufkirchen (DE)

(73) Assignee: MBDA DEUTSCHLAND GMBH, Schrobenh Ausen (DE)

( * ) Notice: Subject to any disclaimer, the term of this patent is extended or adjusted under 35 U.S.C. 154(b) by 33 days.

(21) Appl. No.: 15/298,615

(22) Filed: Oct. 20, 2016

(65) Prior Publication Data

US 2017/0113812 A1 Apr. 27, 2017

(30) Foreign Application Priority Data

Oct. 21, 2015 (DE) .......................... 10 2015 013 642

(51) Int. Cl.
*B64D 45/00* (2006.01)
*G05D 1/00* (2006.01)
(Continued)

(52) U.S. Cl.
CPC ............ *B64D 45/00* (2013.01); *B64C 39/024* (2013.01); *B64D 47/08* (2013.01); *G05D 1/0055* (2013.01); *B63B 2035/007* (2013.01); *B63B 2035/008* (2013.01); *B64C 2201/141* (2013.01); *B64C 2201/146* (2013.01)

(58) Field of Classification Search
CPC ...... B64D 45/00; B64D 47/08; B64C 39/024; B64C 2201/141; B64C 2201/146; B63B 2035/007; B63B 2035/008
See application file for complete search history.

(56) References Cited

U.S. PATENT DOCUMENTS 3,749,333 A  7/1973  Lykken et al.
6,142,411 A  11/2000 Cobleigh
(Continued)

OTHER PUBLICATIONS

German Patent Office, German Office Action for German Patent Application No. 10 2015 013 642.9 dated Sep. 21, 2016.
(Continued)

*Primary Examiner* — Yuen H Wong
(74) *Attorney, Agent, or Firm* — Lorenz & Kopf LLP

(57) ABSTRACT

A safety function module for a vehicle is provided. The safety function module comprises a status determination unit which is configured to determine at least a position of the vehicle. Thereby, the safety function module is configured to be reversibly coupled with a signal interface of the vehicle and is further configured to execute a comparison of the determined position of the vehicle with a predeterminable position range and to transmit an activation signal for a safe state of the vehicle to the signal interface if the position of the vehicle departs from the predeterminable position range. As the safety function module is functionally separated from the remaining components of the vehicle, the extent of possible interdependencies of the safety functions with other components of the vehicle may be reduced or eliminated.

9 Claims, 2 Drawing Sheets

(51) Int. Cl.
    *B64C 39/02*     (2006.01)
    *B64D 47/08*     (2006.01)
    *B63B 35/00*     (2006.01)

(56) References Cited

U.S. PATENT DOCUMENTS

| | | |
|---|---|---|
| 8,868,258 B2 | 10/2014 | Papadopoulos et al. |
| 2009/0254278 A1 | 10/2009 | Wang |
| 2010/0270418 A1* | 10/2010 | Gazard .................... F41G 7/34 244/3.1 |
| 2014/0067164 A1* | 3/2014 | Papadopoulos ........ B64G 1/002 701/3 |
| 2017/0277185 A1* | 9/2017 | Duda ..................... B64D 45/00 |

OTHER PUBLICATIONS

Kendoul F., et al. "Embedded autopilot for accurate waypoint navigation and trajectory tracking: Application to miniature rotorcraft UAVs", 2009 IEEE International Conference on Robotics and Automation, May 12, 2009, pp. 2884-2890.

European Patent Office, European Search Report for European Patent Application No. 16194989.6 dated Feb. 2, 2017.

* cited by examiner

SAFETY FUNCTION MODULE FOR A VEHICLE, IN PARTICULAR FOR A FLYING OBJECT

CROSS-REFERENCE TO RELATED APPLICATION

This application claims priority to German Patent Application No. 102015013642.9, filed Oct. 21, 2015, which is incorporated herein by reference in its entirety.

TECHNICAL FIELD

The embodiments described herein relate to a safety function module for a vehicle, in particular for a flying object, and to a flying object with such a safety function module.

BACKGROUND

Autonomous vehicles and, in particular, unmanned flying object, may be designed such that a target coordinate to be achieved is transmitted to them and that these vehicles then try to autonomously reach this given to be reached target coordinate. Thereby, an autonomous vehicle or an unmanned flying object may be designed such that may autonomously choose the route to the target within a given corridor.

The autonomous vehicles as well as the flying objects may be designed for transport of a payload. The payload may be substances or a mixture of substances which may represent a threat for the surrounding and which, hence, must not leave the given position range. However, if the autonomous vehicle or the flying object leaves the given position range, an action may be required in case of this event. These actions may in particular be that the vehicle or the flying object is brought into a safe state.

Bringing the vehicle or the flying object into a safe state may, for example, consist of one or more of the following measures: destroying or dropping the payload, switching off the drive of the vehicle/flying object; overwriting the target coordinate of the vehicle/flying object with a new value which represents a coordinate to be headed for in case of a failure. In addition, further measures are possible, all of which aim for the goal to influence the vehicle/the flying object so that a failure of the same does not result in an unwanted harm out of the given position range.

In addition, other objects, desirable features and characteristics will become apparent from the subsequent summary and detailed description, and the appended claims, taken in conjunction with the accompanying drawings and this background.

SUMMARY

There may be a need to increase the safety during operation of an autonomous or semi-autonomous vehicle, in particular of a flying object.

According to a first non-limiting embodiment, a safety function module for a vehicle is provided, which safety function module comprises a status determination unit. The status determination unit is configured to determine at least a position of the vehicle. Thereby, the safety function module is configured to be reversibly coupled with a signal interface of the vehicle and is further configured to execute a comparison of the determined position of the vehicle with a predeterminable position range and to transmit an activation signal for a safe state of the vehicle to the signal interface if the position of the vehicle departs from the predeterminable position range.

The safety function module may be reversibly coupled with the vehicle and moves together with the vehicle along its route to the target. Thereby, the safety function module serves the purpose of monitoring the position and/or the line of movement of the vehicle and transmitting the activation signal for the safe state to the vehicle in case of violation of the given position range or in case of imminent violation of this position range so that the vehicle takes this safe state as a result thereof or measures are taken as to bring the vehicle to the safe state.

Hence, the safety function module is basically functionally and structurally separable from the vehicle and can be configured separate from the vehicle. This enables to separate the aspect of monitoring of the vehicle's movement from the functionality of the movement and the movement control. Furthermore, the safety function module may be verified and certified separate from the vehicle.

A vehicle as described herein may, in particular, be an unmanned, autonomously or semi-autonomously moved vehicle. The vehicle may be a land vehicle, aircraft, or watercraft which is designed to attain a given target or a target coordinate. For this purpose, the vehicle comprises a suitable drive and guiding unit as to follow a given or self-chosen motion path.

A state of the vehicle may, in particular, be understood as referring to its position, orientation, and its direction of movement. In the context of an aircraft, this also refers to the height above ground. In the context of a watercraft or submarine vehicle, this may refer to the distance from the water surface or to the distance from bottom of the sea. Furthermore, the state of the vehicle may also refer to the state of the payload, depending on which the vehicle must be brought to the safe state (transferred to the safe state). For example, the state of the payload may require dropping or destroying the payload if the safety corridor is left prior to reaching the target coordinate.

The safety function module is reversibly coupled with the vehicle. This means that there is a connection point which is detachable without the necessity of intervening in the vehicle or the safety function module, aside from the connection point. The connection point may be a plug connection, for example. In addition to the plug connection, the safety function module may be coupled with the vehicle via sole mechanic attachment means (without functional influence to the connection between the safety function module and the vehicle), as to increase the mechanic strength of the connection, so that a separation of the safety function module from the vehicle is prevented during movement of the vehicle, for example as a result of vibrations.

The given position range may also be referred to as area of operations or safety corridor or corridor. This may be a distinct territory on the surface of the earth (land and/or water surface) and/or an air space (an analogy thereto for a submarine: an underwater space). This position range may be defined by a multitude of coordinates and interconnecting edges. This given position range generally must not be left by the vehicle. However, if such a leaving of this position range happens, the vehicle must be brought to the safe state. Depending on the type of the vehicle or the type of the flying object, the position range may be larger or smaller. In case of a ballistic flying object, the position range (flight corridor) is narrow, by way of comparison, as there are no possibilities of intervention during the flight time as to adapt the direction and to return to the given flight corridor in case of an estimated miss of the target coordinates. On the other hand, in case of a steerable flying object, the flight corridor may be larger as the direction of movement may be adapted here.

For bringing the vehicle to the safe state, an activation signal is transmitted by the safety function module to the vehicle. In the vehicle, the corresponding functions which are provided for the safe state are executed subsequently. As the safety function module may be used in different vehicles and types of vehicles, the definition of the safe state is not contained in the safety function module. Rather, the vehicle contains the required instructions which, however, are activated or executed at the instance of the safety function module (i.e., after transmittal of the activation signal).

The flying object may either contain static coordinates or be assigned a moving target. In case of a moving target which the flying object follows autonomously, the safe state may be activated if the target was lost, in particular.

Hence, the safety function module accompanies the vehicle and thereby covers its motion path. During this movement, the position and the line of movement of the vehicle may be monitored or supervised, as the safety function module follows the same line of movement. If the vehicle leaves the given position range, this is recognized by the safety function module as a result of a comparison of the current position with the given position range and the activation signal for the safe state is generated and delivered to the vehicle. The safety function module may determine or request the current position on a regular basis, e.g. with a frequency of multiple Hertz (Hz) up to multiple kilo-Hertz (kHz) or even Mega-Hertz (MHz). The frequency of the position determination may be varied depending on the velocity of the vehicle, e.g. the frequency of the position determination may increase at increasing velocity.

The functions of the monitoring of the movement of the vehicle are contained in a separate component (in the safety function module) and not in the remaining existing components of the vehicle. Due to this functional, logic, and structural separation, possible influences by the components of the vehicle to the safety functions of the safety function module are eliminated on the one hand, and the safety function module may be verified and certified as individual component on the other hand.

According to an embodiment, the safety function module is configured to capture a direction of movement of the vehicle.

Thereby, an estimate may take place, whether the given position range will be left if the current direction of movement is maintained. This information may be used to determine the current position of the vehicle and to compare it with the given position range with a higher frequency (higher frequency of position determination) in case of getting closer to the border of the given position range. Hence, it may be determined with little delay when the given position range is left.

According to a further embodiment, the safety function module is configured to capture a velocity of the vehicle.

Hence, an estimate may take place when the vehicle leaves the given position range in case of maintaining the current direction of movement. This information may be helpful for preparing the status determination unit such that the activation signal is transmitted as early as possible in case of leaving the given position range (crossing an edge or an area which limits the position range).

According to a further embodiment, the safety function module as described herein comprises a configuration interface via which the given position range may be transmitted to the status determination unit.

Hence, the safety function module can be configured separate from the vehicle. Thus, the safety function module does not need to access data of the vehicle if the current position is compared with the given position range.

According to a further embodiment, the safety function module comprises a sensor unit which is configured to determine the current position of the vehicle.

Thus, the safety function module is not reliant on sensors of the vehicle, even an interface to such external (with reference to the safety function module) sensors, i.e., vehicle sensors, may be omitted. This may also contribute to increasing of the safety as the sensor unit is part of the safety function module and is directly connected with the components of the safety function module. Hence, the effort for verification and certification of the safety function module must be made once only. Thus, the status determination unit is verified together with the sensor unit, and the safety function module may be completely taken out of the vehicle in this composition and be used in another vehicle.

Therefore, the safety function module enables a modular reuse in different vehicles and is independent of the vehicle as well as of its functional design.

According to a further embodiment, the sensor unit comprises an optical sensor for capturing the environment.

Hence, it may be determined based on prominent landmarks, for example, if the given position range is left. The data provided by the optical sensor may be processed and prepared by means of image processing and then compared with existing terrain data, for example from a radar system, as to determine the position of the vehicle in the terrain. The optical sensor may be a camera or an infrared camera.

The sensor unit may comprise any sensors for capturing the environment.

According to a further embodiment, the sensor unit comprises an inertial navigation arrangement which is configured to determine a position and a direction of movement of the vehicle.

Hence, it is enabled to determine the position and the direction of movement with a second, redundant system separate and independent of the optical or environment capturing sensor.

According to a further embodiment, the sensor unit comprises an arrangement for satellite-based determination of the position.

This may be, for example, units for position determination which use, for example, GPS (Global Positioning System) or Galileo as well as other satellite navigation systems.

According to a further embodiment, the safety function module is designed as a single structural assembly.

Hence, the safety function module may be removed from the vehicle and be inserted in another vehicle with little mounting effort. In one embodiment, the components of the safety function module may be located in a single common housing which comprises a plug interface and mechanic fastening means as to functionally and mechanically couple the safety function module with the vehicle.

According to a further non-limiting embodiment, a flying object is provided which comprises a safety function module as described herein, wherein the safety function module is reversibly coupled with the flying object.

The flying object may be a missile, for example, the object of which it is to bring a payload to a given target coordinate. A position range (area of operations, motion corridor) is provided for the path to the target coordinate which the flying object must not leave. The safety function module is configured to monitor the motion path of the flying object and to transmit a signal for activating a safe state to the flying object in case of leaving the given position range.

In other words, the characteristics of the safety function module and of the vehicle or the flying object as described above may be summed up as follows:

It is an aspect in the design of flying objects to provide a safety functionality for avoiding leaving of a given motion corridor. This safety functionality is provided by a safety function module which can be modularly inserted in a vehicle and the functions of which are logically and structurally separated from the functions of the vehicle or the flying object. This may, in particular, have advantages for flying objects which autonomously track a stationary or moving target after the start. Here, preferably all safety functions are implemented in a single module or in a single assembly. These isolated safety relevant functions may be typically realized by electric, electronic, or programmable and configurable systems (for example use of an FPGA, field programmable gate array, and of VHDL, very high speed integrated circuit hardware description language). Thus, the safety function module may be reused and is independent of the type of vehicle or type of flying object. Merely the output of the activation signal for taking the safe state happens via the defined transmission interface. As the safety function is provided in a separate module, the development time for vehicles may be reduced due to the fact that only the interface to the safety function module must be provided. Testing of integrated safety functions and safety function blocks is omitted and proven technologies may be utilized in the modular safety function module. The safety function module may be tested on its own and is little or only minimal dependent on neighboring systems or sub-systems.

In case the vehicle receives the activation signal for the safe state, it may turn off the drive unit or drop the payload. In one embodiment, the safety function module may be configured to receive status information from the vehicle, in particular information about the drive unit or about the energy storage, as to determine if the available energy is sufficient for reaching the provided target. Is this probably not the case, the safe state may be activated likewise.

BRIEF DESCRIPTION OF THE DRAWINGS

The various embodiments will hereinafter be described in conjunction with the following drawing FIGURE, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
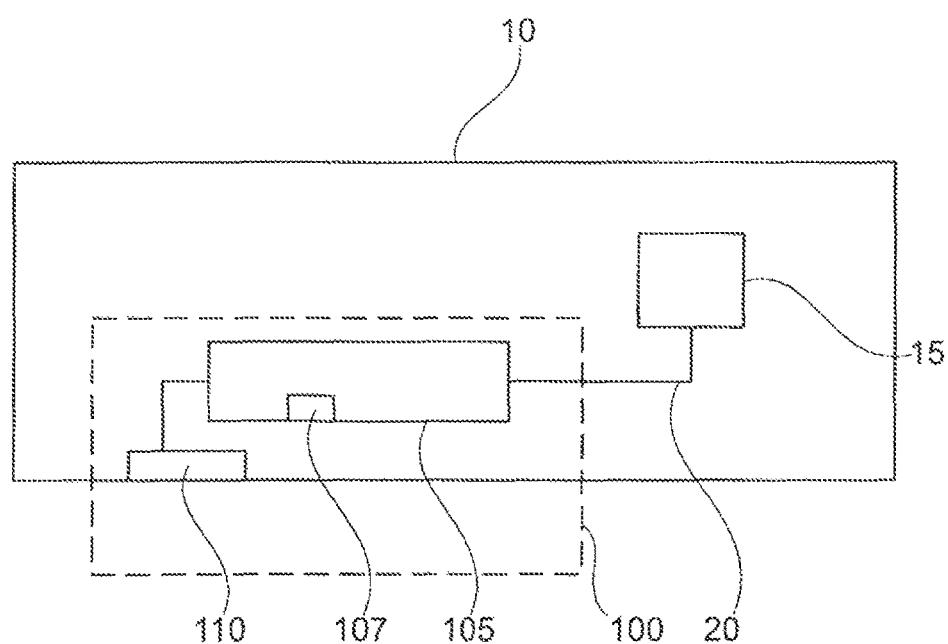
FIG. 1 is a block diagram representation of a flying object with a safety function module according to an exemplary embodiment of the invention.
Figure 2:
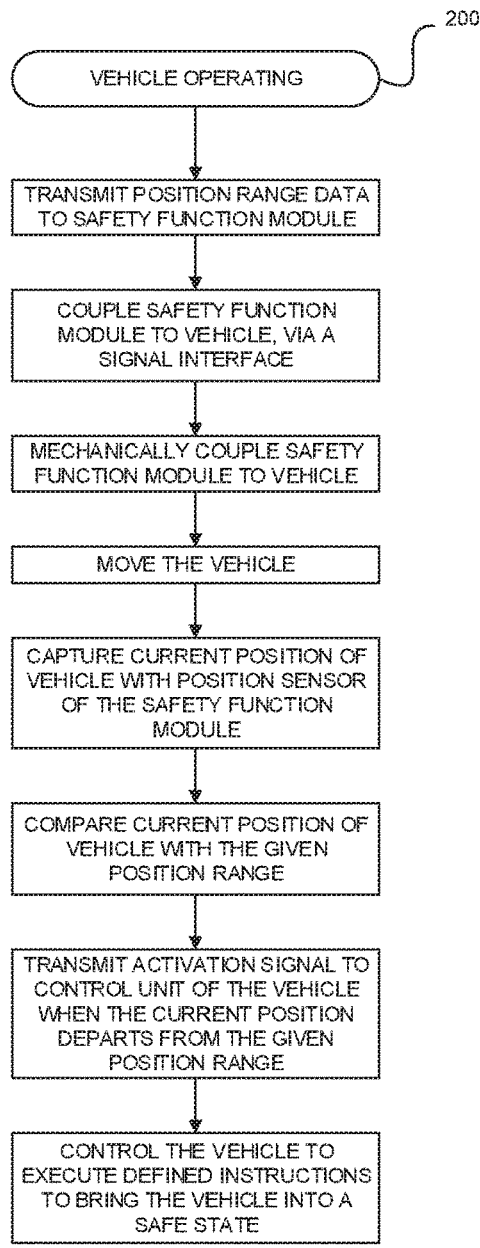
FIG. 2 is a flow chart of a vehicle operating process.

FIG. 1 shows a flying object 10 which comprises a control unit 15 as well as a safety function module 100, and FIG. 2 shows a flow chart of a vehicle operating process 200. The safety function module 100 comprises a status determination unit 105 and a sensor unit 110. The status determination unit 105 comprises a configuration interface 107. The safety function module 100 is coupled with the control unit 15 of the flying object via a signal interface 20.

The safety function module 100 is reversibly coupled with the flying object 10 and with the signal interface 20 of the flying object 10 and is configured to carry out a comparison of the determined position of the vehicle with a given position range and to transmit an activation signal for a safe state of the vehicle to the signal interface if the position of the vehicle departs from the given position range.

The safety function module 100 is mechanically coupled with the flying object 10 so that the safety function module 100 reproduces any movement of the flying object 10. The safety function module 100 can determine and track the motion path and the position of the flying object via the sensor unit. The current position is compared with a given flight corridor which can be transmitted to the safety function module 100 via the configuration interface 107.

In case the flying object leaves the given flight corridor, the safety function module 100 generates an activation signal for the safe state and transmits this signal to the flying object 10 via the signal interface 20, and then the flying object activates the safe state.

The safety function module 100 may be configured such that status information of the flying object are transmitted to the safety function module 100 via the signal interface 20. This status information may contain, in particular, information about a drive energy storage (reserve of available energy) and about the drive unit (function information, for example).

Based on these information, the safety function module 100 may determine, if achieving the provided target can be guaranteed. Should this not apply, the activation signal for the safe state may likewise be transmitted to the flying object.

Hence, the safety functions of the flying object 10 are encapsulated in the safety function module 100 and are protected from interdependencies with other components of the flying object to the greatest possible extent.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An unmanned autonomously flying object, comprising:
    a control unit that controls the flying object;
    a safety function module reversibly coupled to the control unit via a signal interface by a plug connection, and reversibly mechanically coupled to the flying object, the safety function module comprising:
        a sensor unit comprising a position sensor to determine at least a current position of the flying object; and
        a configuration interface configured to be coupled to an external data source for receiving a given position range including flight corridor data;
    wherein the safety function module is configured to carry out a comparison of the current position of the flying object with the given position range and to transmit an activation signal to the control unit of the flying object via the signal interface when the current position of the flying object departs from the given position range; and wherein, in response to receiving the activation signal, the control unit of the flying object autonomously controls the flying object to bring the flying object into a safe state.

2. The unmanned autonomously flying object of claim 1, wherein the safety function module is configured to capture a direction of movement of the flying object.

3. The unmanned autonomously flying object of claim 1, wherein the safety function module is configured to capture a velocity of the flying object.

4. The unmanned autonomously flying object of claim 1, wherein the sensor unit comprises an optical sensor to capture an image of an environment.

5. The unmanned autonomously flying object of claim 1, wherein the position sensor is an inertial navigation arrangement configured to determine a position and a direction of movement of the flying object.

6. The unmanned autonomously flying object of claim 1, wherein the position sensor comprises an arrangement for satellite-based determination of the position.

7. The unmanned autonomously flying object of claim 1, wherein the safety function module comprises a single structural assembly.

8. A system, comprising:
an autonomously moved flying object comprising a control unit and a vehicle plug connection which forms a signal interface of the control unit;
a safety function module, comprising:
 a module plug connection which is provided for being coupled to the vehicle plug connection;
 a sensor unit including a position sensor for determining a current position of the flying object; and
 a configuration interface; and
an external data source configured to be coupled to the configuration interface to transmit a given position range including flight corridor data;
wherein, when coupled to the flying object, the safety function module is configured to carry out a comparison of the current position of the flying object with the given position range and to transmit an activation signal to the control unit of the flying object via the signal interface when the current position of the flying object departs from the given position range; and
wherein, in response to receiving the activation signal, the control unit of the flying object autonomously controls the flying object to bring the flying object into a safe state.

9. A method of operating an unmanned autonomously flying object, the method comprising:
transmitting a given position range data to a safety function module;
coupling the safety function module to the flying object via a signal interface;
mechanically coupling the safety function module to the flying object;
moving the flying object;
capturing a current position of the flying object by a position sensor of the safety function module;
comparing the captured current position of the flying object with the given position range;
transmitting an activation signal to a control unit of the flying object when the captured current position of the flying object departs from the given position range; and
in response to receiving the activation signal, autonomously controlling the flying object with the control unit, to bring the flying object into a safe state.

* * * * *